United States Patent
Saitou et al.

(10) Patent No.: US 6,674,414 B2
(45) Date of Patent: Jan. 6, 2004

(54) CAR NAVIGATION DISPLAY SYSTEM

(75) Inventors: Yasuo Saitou, Tokyo (JP); Yasukazu Ishii, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 210 days.

(21) Appl. No.: 09/934,575

(22) Filed: Aug. 23, 2001

(65) Prior Publication Data

US 2002/0140635 A1 Oct. 3, 2002

(30) Foreign Application Priority Data

Mar. 29, 2001 (JP) ........................................ 2001-096795

(51) Int. Cl.⁷ .............................................. G01C 21/00
(52) U.S. Cl. ........................................ 345/30; 701/208
(58) Field of Search ........................... 345/30; 701/211, 701/212, 208, 213, 207; 340/988, 990; 346/161; 725/37; 386/46, 126

(56) References Cited

U.S. PATENT DOCUMENTS

| | | | | |
|---|---|---|---|---|
| 5,459,667 A | * | 10/1995 | Odagaki et al. | 701/209 |
| 6,243,645 B1 | * | 6/2001 | Moteki et al. | 701/211 |
| 6,466,735 B1 | * | 10/2002 | Kozuka et al. | 386/126 |
| 2002/0152462 A1 | * | 10/2002 | Hoch et al. | 725/37 |
| 2002/0196233 A1 | * | 12/2002 | Kataoka et al. | 345/161 |
| 2003/0016941 A1 | * | 1/2003 | Unemura | 386/46 |

FOREIGN PATENT DOCUMENTS

WO     WO98/20303     5/1998

* cited by examiner

Primary Examiner—Vijay Shankar
Assistant Examiner—Nitin Patel
(74) Attorney, Agent, or Firm—Sughrue Mion, PLLC

(57) ABSTRACT

At the time of playing back a map disk, map data such as a destination route is prestored in an internal memory or external recording medium, and at the time of playing back an AV disk, the map data is read out of the internal memory or external recording medium, and the read-out map data is displayed as a lave picture, or in one of two divided monitor screen areas, together with reproduced pictures of the AV disk.

9 Claims, 3 Drawing Sheets

MUSIC CD
PLAYED BACK

Track 1

01:00:31

CAR NAVIGATION DISPLAY SYSTEM

BACKGROUND OF THE INVENTION

1. Field of the Invention

The present invention relates to a car navigation display system that displays additional information on a monitor screen on which audio or video information from a music CD or video DVD is being displayed by a car navigation system.

2. Description of the Prior Art

An early car navigation system displays only map information (a map and associated characters or the like) on the monitor screen at the time of playing back a map disk. Since a CD and a DVD are now in widespread use as AV (music and video) media, however, the current car navigation system is additionally equipped with a playback capability that shuffles one CD/DVD drive back and forth between a map disk and an AV disk such as a music CD or video DVD. With such a system, for example, when the music CD is being played back, track information of the CD being played back is displayed on the monitor screen as depicted in FIG. 4 and music is reproduced from a loudspeaker. When the video DVD is being played back, such reproduced pictures as shown in FIG. 5 is displayed on the monitor screen, and the audio of its contents are output from the loudspeaker.

With the conventional car navigation display system of the above construction, when the AV disk is being played back, the monitor displays only information about the AV media without displaying any navigation information. Hence, when driving while playing back the AV disk, the driver cannot get any traffic congestion or map information. In particular, during playback of the music CD, since the monitor screen merely displays the track information being played back, the display changes only slightly and no useful information is not offered to the driver.

Further, there is also under study a system that permits simultaneous use of the navigation function by the map disk and the AV disk playback function, but to playback the map and AV disks at the same time, it is necessary to mount a player for the map disk and an AV disk player on the navigation system unit. This inevitably makes the unit bulky, which is undesirable due to limitations of space in the car, and such an integral structure raises the cost of the system. Under the present circumstances, it is customary in the art to employ a dual-purpose player for reading out the map disk and playing back the AV disk.

SUMMARY OF THE INVENTION

It is therefore an object of the present invention to provide a navigation display system that enables navigation information or the like to be displayed on the monitor screen on which pictures are being played back from the AV disk.

According to an aspect of the present invention, in a car navigation display system provided with a CD/DVD drive which shuffles back and forth between a map disk and an AV disk, when a map disk is played back, map data such as destination route is prestored in an internal memory or external recording medium, then at the time of playing back the AV disk, the prestored map data is read out of the internal memory or external recording medium, and the read-out map data is displayed as a slave picture, or in one of two divided monitor screen areas, together with reproduced pictures of the AV disk on the monitor.

According to another aspect of the present invention, in a car navigation display system provided with a CD/DVD drive which shuffles back and forth between a map disk and an AV disk, when a map disk is played back, traffic information fed from VICS, beacon receivers, or the like is stored in an internal memory or external recording medium, then at the time of playing back the AV disk, the stored traffic information is read out of the internal memory or external recording medium, and the read-out traffic information is displayed as a slave picture, or in one of two divided monitor screen areas, or as a telop, together with the reproduced pictures of the AV disk on the monitor.

According to still another aspect of the present invention, in a car navigation display system provided with a CD/DVD drive which shuffles back and forth between a map disk and an AV disk, information received from information equipment connected to the outside is stored in an internal memory or external recording medium, then at the time of playing back the map disk or AV disk, character/image data contained in the stored information is read out therefrom, and the character/image data thus read out is displayed as a slave picture, or in one of two divided monitor screen areas, or as a telop, together with the reproduced pictures of the map disk or AV disk on the monitor.

DETAILED DESCRIPTION OF THE PREFERRED EMBODIMENTS

Embodiment 1

Figure 1:
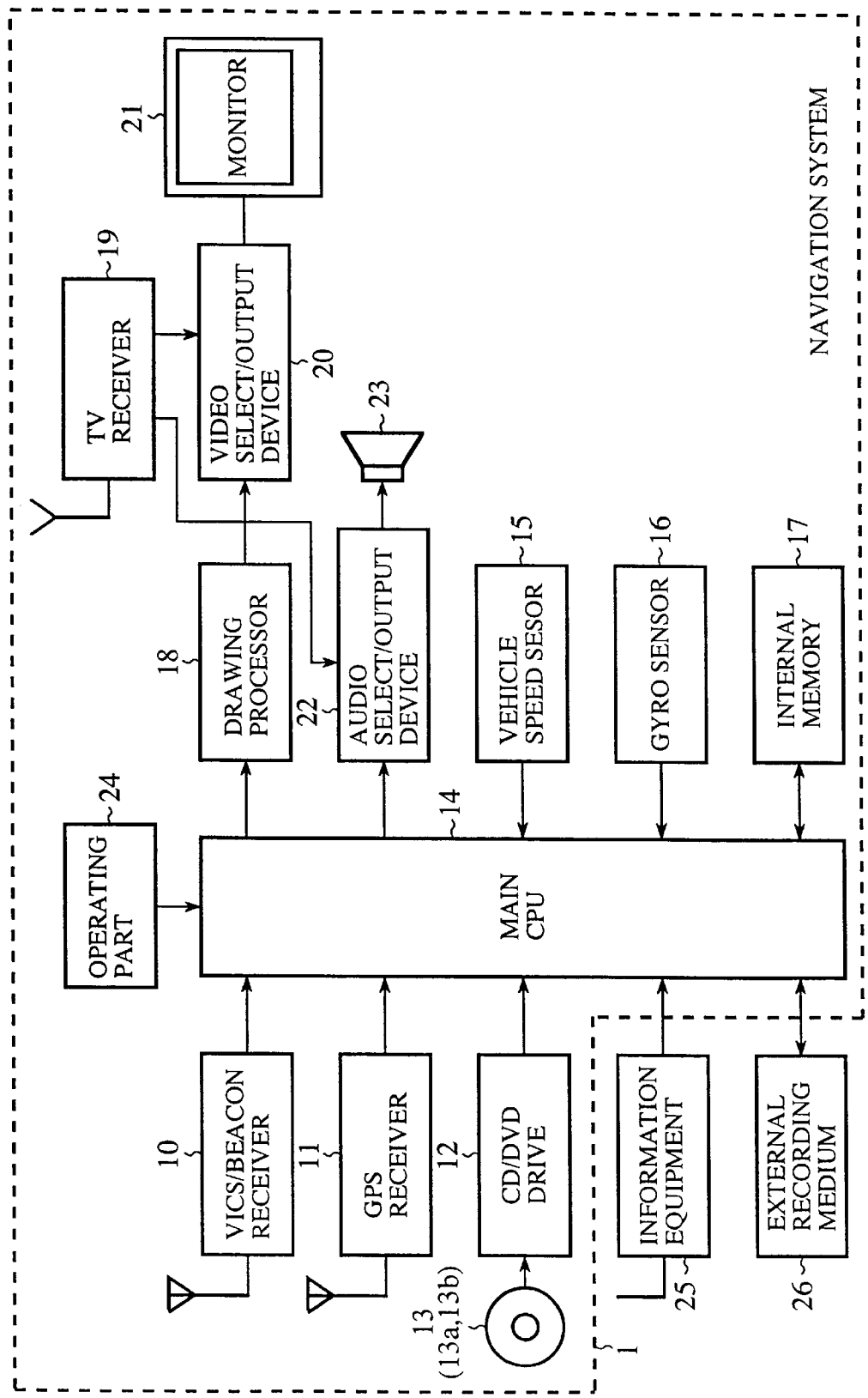
FIG. 1 is a block diagram illustrating the basic configuration of a navigation display system according to the present invention.

FIG. 1 illustrates in block form the general configuration of a navigation display system according to the present invention. Reference numeral 1 denotes generally a navigation display system basically identical in configuration with the prior art. Reference numeral 10 denotes a VICS beacon receiver for receiving beacon information provided from radio or lighted beacons placed at road at roadsides. The beacon information mentioned herein includes plural pieces of VICS (Vehicle Information and Communication System) information such as congestion information, control information, current position information, accident information, parking lot information, character information and simplified graphic information. VICS is an information provider service for vehicles in Japan. In Europe, TMC (Traffic Message Channel) provides a same service. Reference numeral 11 denotes a GPS receiver for receiving position information about the driver's vehicle that is sent from a satellite.

Reference numeral 12 denotes a CD/DVD drive (which may any one of CD-specific, DVD-specific and dual-purpose CD and DVD drives) for driving a CD/DVD 13 inserted therein. The CD/DVD 13 is a map disk 13a with map data stored thereon or an AV disk 13b with audio and video information stored thereon. Reference numeral 14 denotes a main CPU, which processes signals fed from respective functional parts. Reference numeral 15 denotes a vehicle speed sensor, and 16 denotes a gyro sensor, which performs matching with map data available from a map disk and derives therefrom signals for displaying the current position and driving route of the driver's vehicle on the monitor screen. Reference numeral 17 denotes a built-in memory for temporary storage of data processed by the main CPU 14. Reference numeral 18 denotes a drawing processor for generating image signals for displaying map data and video information processed by the main CPU 14 on the screen of a monitor 21. Reference numeral 19 denotes a TV receiver, and 20 denotes a video select/output device, which selects either one of an image signal from the drawing processor 18 and a video signal from the TV receiver 19 and generates an image output that provides an appropriate display image on the screen of the monitor 21.

Reference numeral 22 denotes an audio select/output device, which selects either one of an audio signal (audio for map information, or audio reproduced from AV media) processed by the main CPU 14 and an audio signal from the TV receiver 19 and generates an audio output appropriate for reproduction by a loudspeaker 23. Reference numeral 24 denotes an operating part for operating the navigation system 1, which includes an operating panel and a touch panel of the monitor 21. Reference numeral 25 denotes information equipment which is connected to the navigation system 1, as required, such as a portable telephone. Reference numeral 26 denotes an external recording medium such as a memory card. There is also provided an FM/AM receiver, though not shown.

Since general operations for navigation, AV media reproduction and TV reception by the navigation system of FIG. 1 are well-known, no description will be given.

When the map disk 13a is inserted into the CD/DVD drive 12 for use, the latest display data of map information such as route information is prestored in the internal memory 17 or external recording medium 26.

Next, when the AV disk 13b is played back in place of the map disk 13a, track information is displayed on the monitor 21 when a music CD is being played back. When a video DVD is being played, the video is displayed on the monitor 21.

Figure 2:
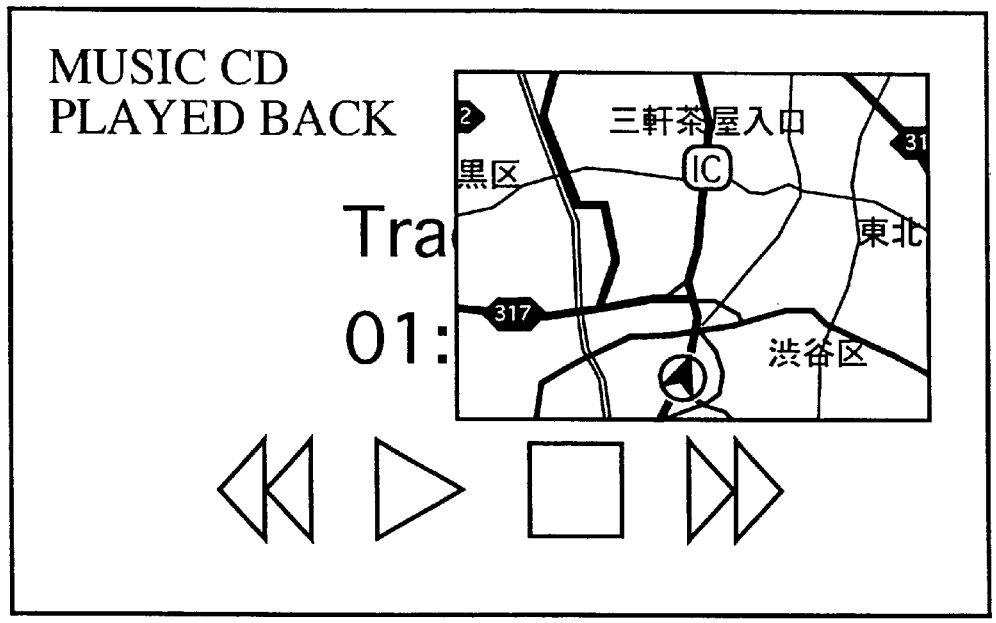
FIG. 2 is a diagram showing an example of a display according to a first embodiment of the present invention.

If it is desirable in this state to provide an additional display of map information on the monitor 21, the map data prestored in the internal memory 17 or external recoding medium 26 is read out thereof, and it is displayed, for instance, as a slave display image or picture superimposed on the track information or video on the monitor 21. This operation is processed by the main CPU 14 and the drawing processor 18. FIG. 2 shows an example in which map information is displayed as such a slave display image or picture superimposed on the track information of the music CD being played back.

The map data to be prestored includes a route to a destination and so forth. Since the map data is displayed in slave form, it is advisable to simplify or compress the map data during recording or playback to ensure displaying only necessary information. Further, the screen may be divided into two, in which case it is preferable to pre-record map data for the two-screen display on the map disk.

As described above, according to this embodiment, even when the CD/DVD 13 is being used for other media than map data, the map data is displayed together with the reproduced information of the AV media on the monitor 21. Hence, it is possible to offer useful information to the driver.

Embodiment 2

Figure 3:
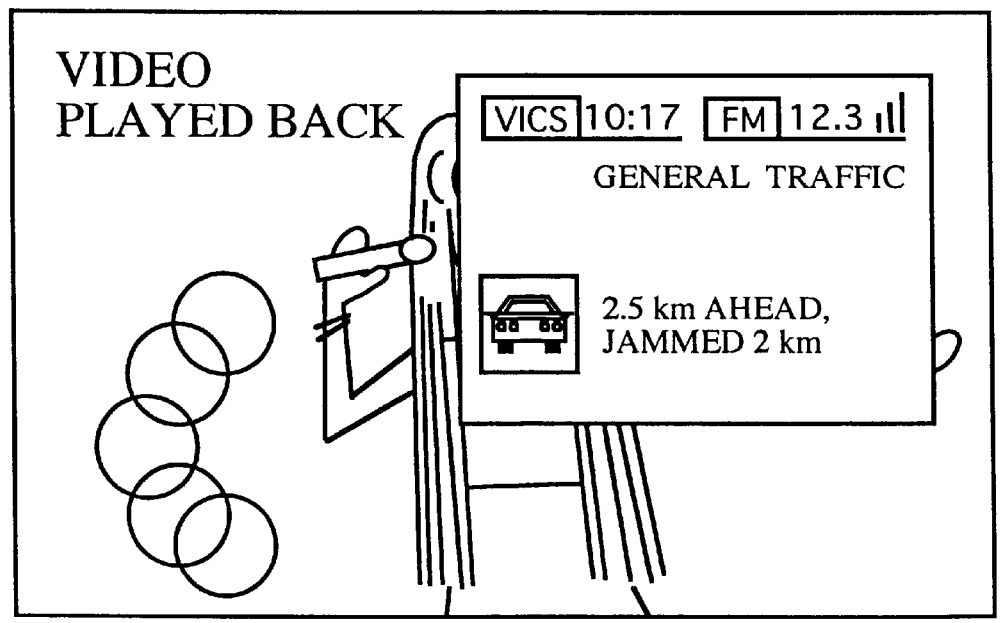
FIG. 3 is a diagram showing an example of a display according to a second embodiment of the present invention.
Figure 4:
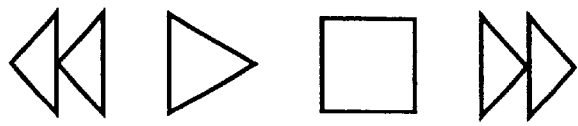
FIG. 4 is a diagram showing an example of a display provided by a conventional navigation display system.
Figure 5:
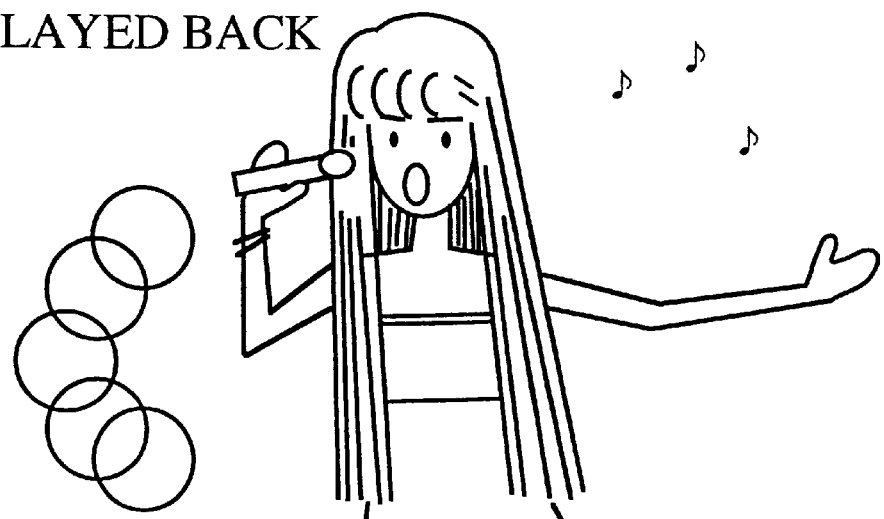
FIG. 5 is a diagram showing another example of the display provided by a conventional navigation display system

Of navigation information, information available from the outside by means of communication, such as VICS information, is receivable even while the AV disk 13b is being played back by the navigation system 1. Of the VICS information, timely traffic information such as level 1 (character information) and level 2 (simplified graphic information) is received by the VICS beacon receiver 10 or an FM receiver and fed to the internal memory 17 or external recording medium 2, wherein the received information is rendered into a data structure necessary for display. The VICS information thus prepared is read out as required, and displayed as a slave screen display or picture overlapping the played-back information of the AV disk 13b. In this instance, the screen may be divided into two to permit the display of the VICS information and the AV information. FIG. 3 is an example of displaying congestion information in slave form while the video DVD is being played back.

In this case, since a video is displayed when the AV disk 13b is played back, the congestion information may be displayed as a telop or in transparent form.

As described above, according to this embodiment, even when the CD/DVD drive 12 is being used to play back the AV media, traffic information available from the outside is displayed together with the reproduced pictures of the AV media. Hence it is possible to offer timely traffic information to the driver.

Embodiment 3

A portable telephone, a PC, an FM teletext receiver and so forth can be used as external information equipment, and there will be provided character/image data of digital broadcasts in future. For example, the information equipment 25 such as a portable telephone is connected to the navigation system 1 to obtain www information of the Internet, i-mode, EZ-WEB (i-mode, EZ-WEB are internet provider service for cellular phone in Japan) and so on by communications, and such information is stored in the internal memory 17 or the external recording medium 26. The character/image data is read as required, and is displayed as a slave picture, or in one of two divided monitor screen areas, or as a telop, together with the reproduced pictures of the AV disk 13b.

In the case where the CD/DVD 13 is the map disk 13a, too, the read-out data of the above-mentioned www information may similarly be displayed overlapping the on-screen map information. In the case of a portable telephone, calling party data and the reception of an incoming call may be displayed overlapping a slave picture or at a different position on the screen.

In the case of using the information equipment 25, it is also possible, of course, to display only character/image data from the information equipment 25 on the monitor 21. Further, the information equipment 25 and the navigation system 1 may be connected by radio.

According to this embodiment, the information equipment 25 is connected to the navigation system 1, and even while CD/DVD 13 is being played back, the character/image data available from the information equipment 25 can be displayed together with reproduced pictures on the monitor 21. Hence, it is possible to offer useful information to the driver and a fellow passenger.

Effect of the Invention

As described above, according to an aspect of the present invention, when a map disk is played back, map data such as destination route is prestored in an internal memory or external recording medium, then at the time of playing back an AV disk, the prestored map data is read out of the internal memory or external recording medium, and the read-out map data is displayed as a slave picture, or in one of two divided monitor screen areas, together with reproduced pictures of the AV disk on the monitor. Hence, even while the CD/DVD drive is being used to play back other media than the map disk, the map data can be displayed together with the reproduced picture of the AV media.

According to another aspect of the present invention, traffic information fed from VICS, beacon receivers, or the like is stored in an internal memory or external recording medium, then at the time of playing back an AV disk, the stored traffic information is read out of the internal memory or external recording medium, and the read-out traffic information is displayed as a slave picture, or in one of two divided monitor screen areas, or as a telop, together with the reproduced pictures of the AV disk on the monitor. Hence, even while the CD/DVD drive is being used to play back the AV media, traffic information available from the outside can be displayed together with the reproduced picture of the AV media.

According to still another aspect of the present invention, information received from information equipment connected to the outside is stored in an internal memory or external recording medium, then at the time of playing back a map disk, character/image data contained in the stored information is read out of the internal memory or external recording medium, and the character/image data thus read out is displayed as a slave picture, or in one of two divided monitor screen areas, or as a telop, together with the reproduced pictures of the map disk or AV disk on the monitor. Hence, even while the CD/DVD is being played back, the character/image data available from the information equipment can be displayed together with the reproduced picture of the CD/DVD.

What is claimed is:

1. A car navigation display system provided with a CD/DVD drive which shuffles back and forth between a map disk and an AV disk, in which: map data such as a destination route is prestored in an internal memory or external recording medium at the time of playing back said map disk; then at the time of playing back said AV disk, said prestored map data is read out of said internal memory or external recording medium, and said read-out map data is displayed as a slave picture, or in one of two divided monitor screen areas, together with reproduced pictures of said AV disk on a monitor.

2. A car navigation display system provided with a CD/DVD drive which shuffles back and forth between a map disk and an AV disk, in which: traffic information from VICS or beacon receivers or the like is stored in an internal memory or external recording medium; then at the time of playing back said AV disk, said stored traffic information is read out of said internal memory or external recording medium, and said read-out traffic information thus read out is displayed as a slave picture, or in one of two divided monitor screen areas, or as a telop, together with reproduced pictures of said AV disk on a monitor.

3. A car navigation display system provided with a CD/DVD drive which shuffles back and forth between a map disk and an AV disk, in which: information available from externally-connected information equipment is stored in an internal memory or external recording medium; then at the time of playing back said map disk or AV disk, character/image data contained in said stored information is read out of said internal memory or external recording medium, and said read-out character/image data is displayed as a slave picture, or in one of two divided monitor screen areas, or as a telop, together with reproduced pictures of said map disk or AV disk on a monitor.

4. A method for displaying information of a car navigation display system comprising:

storing navigation or map data of a map disk in an internal memory or external recording medium while the map disk is being played back;

playing back an AV disk for display of AV disk information on a monitor;

reading out the navigation or map data stored in the internal memory or external recording medium at the same time the AV disk is being played back; and displaying the navigation or map data on the monitor along with the AV disk information, such that the navigation or map data is superimposed on the displayed AV disk information.

5. The method for displaying information according to claim 4, wherein the navigation or map data is superimposed on only a portion of the displayed AV disk information.

6. A method for displaying information of a car navigation display system comprising:

storing traffic information received by a receiver device in an internal memory or an external recording medium;

playing back an AV disk for display of AV disk information on a monitor;

reading out the stored traffic information at the same time the AV disk is being played back; and displaying the stored traffic information on the monitor along with the AV disk information, such that the traffic information is superimposed on the displayed AV disk information.

7. A method for displaying information of a car navigation display system comprising:

storing information from an externally connected information device in an internal memory or external recording medium;

converting the stored information of the externally connected information device into character/image data;

playing back an AV disk for display of AV disk information on a monitor;

reading out the character/image data at the same time the AV disk is being played back; and displaying the character/image data on the monitor along with the AV disk information, such that the character/image data is superimposed on the displayed AV disk information.

8. The method for displaying information according to claim 7, further comprising obtaining and displaying information from the internet through connection with a portable telephone, wherein the portable phone is the externally connected information device.

9. The method for displaying information according to claim 7, further comprising obtaining and displaying call party data and reception of an incoming call of a portable telephone, wherein the portable telephone is the externally connected information device.

* * * * *